United States Patent
Strohmaier et al.

(10) Patent No.: US 6,238,550 B1
(45) Date of Patent: *May 29, 2001

(54) SILICOALUMINOPHOSPHATES HAVING AEL STRUCTURE, A METHOD FOR THEIR PREPARATION AND THEIR USE AS CATALYSTS FOR THE HYDROPROCESSING OF HYDROCARBON FEEDSTOCKS

(75) Inventors: Karl G. Strohmaier, Port Murray; David E. W. Vaughan, Flemington, both of NJ (US); William J. Murphy; Ian A. Cody, both of Baton Rouge, LA (US); Sandra J. Linek, East Hanover, NJ (US)

(73) Assignee: Exxon Research and Engineering Company, Annandale, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/315,418

(22) Filed: May 20, 1999

Related U.S. Application Data (60) Provisional application No. 60/086,681, filed on May 26, 1998.

(51) Int. Cl.$^7$ .................................................. C10G 47/12
(52) U.S. Cl. ............... 208/111.01; 208/109; 208/111.35; 208/111.3; 208/111.15; 208/114
(58) Field of Search ............................... 208/109, 111.01, 208/111.35, 111.3, 111.15, 114

(56) References Cited

U.S. PATENT DOCUMENTS

| | | | |
|---|---|---|---|
| 4,440,871 | 4/1984 | Lok et al. | 502/214 |
| 4,499,315 | 2/1985 | Garska et al. | 585/415 |
| 4,512,875 | 4/1985 | Long et al. | 208/114 |
| 4,683,050 | 7/1987 | Ward | 208/110 |
| 4,724,066 | 2/1988 | Kirker et al. | 208/114 |
| 4,734,185 | 3/1988 | Pellet et al. | 208/114 |
| 4,791,083 | 12/1988 | Pellet et al. | 502/64 |
| 4,803,184 | 2/1989 | Long et al. | 502/63 |
| 4,818,739 | 4/1989 | Gortsema et al. | 502/67 |
| 4,826,804 | 5/1989 | Shamshoum | 502/64 |
| 4,857,495 | 8/1989 | Gortsema et al. | 502/214 |
| 4,859,311 | 8/1989 | Miller | 208/89 |
| 4,859,312 | 8/1989 | Miller | 208/111 |
| 4,859,314 | 8/1989 | Pellett et al. | 208/114 |
| 4,880,760 | 11/1989 | Pellet et al. | 502/67 |
| 4,906,351 | 3/1990 | Pellet et al. | 208/111 |
| 4,913,798 | 4/1990 | Gortsema et al. | 208/111 |
| 4,914,067 | 4/1990 | Pellett et al. | 502/63 |
| 4,921,594 | 5/1990 | Miller | 208/58 |
| 4,943,424 | 7/1990 | Miller | 423/328 |
| 4,960,504 | 10/1990 | Pellet et al. | 208/411 |
| 4,976,846 | 12/1990 | Long et al. | 208/114 |
| 4,992,160 | 2/1991 | Long et al. | 208/111 |
| 5,087,347 | 2/1992 | Miller | 208/46 |
| 5,096,684 | 3/1992 | Guth et al. | 423/306 |
| 5,139,647 | 8/1992 | Miller | 208/100 |
| 5,149,421 | 9/1992 | Miller | 208/114 |
| 5,185,310 | 2/1993 | Degnan et al. | 502/214 |
| 5,208,005 | 5/1993 | Miller | 423/792 |
| 5,300,277 | 4/1994 | Kresge et al. | 423/703 |
| 5,360,474 | 11/1994 | Lauth et al. | 106/402 |
| 5,413,695 | 5/1995 | Miller | 208/28 |
| 5,472,594 | 12/1995 | Tsang et al. | 208/114 |
| 5,486,284 | 1/1996 | Degnan et al. | 208/120 |
| 5,723,716 | 3/1998 | Brandes et al. | 585/734 |
| 5,730,858 | 3/1998 | Olivier et al. | 208/28 |
| 5,770,042 | 6/1998 | Galperin et al. | 208/65 |
| 5,804,058 | 9/1998 | Grandvallet et al. | 208/171 |
| 5,831,139 | 11/1998 | Schmidt et al. | 585/315 |
| 5,833,837 | 11/1998 | Miller | 208/80 |
| 5,879,655 | 3/1999 | Miller et al. | 423/702 |
| 5,888,378 | 3/1999 | Kowalski | 423/702 |
| 5,989,518 | 11/1999 | Tannous et al. | 423/717 |

FOREIGN PATENT DOCUMENTS 146384   6/1990   (EP).

OTHER PUBLICATIONS

K.J. Chao, et al., Silicon species in a SAPO–5 molecular sieve, Applied Catalysis, 72, (1991) 39–49 No month.

M.J. Franco, et al., Study of SAPO–5 obtained from surfactant–containing gels: Part 1. Crystallization parameters and mechanism of Si substitution, Zeolites 15:117–123 (1995) –No month.

J. Agundez, et al., Synthesis of SAPOs from Microemulsions: A General Method to Obtain Materials with Enhanced Catalytic Activity (Abstract), 11th International Zeolite Conference RP25, 1996 –No month.

J. Agundez, et al., Synthesis of SAPOs from Microemulsions: A General Method to Obtain Materials with Enhanced Catalytic Activity, Discussions on Zeolite and Microporous Materials 1997, Hanrimwon Publishing Co., Seoul, Korea –No month.

P. Meriaudeau, et al., Isomorphous substitution of silicon in the AlPO4 framework with AEL structure: n–octane hydroconversion, Microporous and Mesoporous Materials 22 (1998) 435–449 No month.

Primary Examiner—Walter D. Griffin
Assistant Examiner—Nadine Preisch
(74) Attorney, Agent, or Firm—Gerard J. Hughes; Michael A. Cromwell (57) ABSTRACT

Disclosed are silicoaluminophosphates (SAPOs) having unique silicon distributions, a method for their preparation and their use as catalysts for the hydroprocessing of hydrocarbon feedstocks. More particularly, the new SAPOs have a high silica:alumina ratio, and may be prepared from single phase synthesis solutions or from microemulsions containing surfactants.

38 Claims, 7 Drawing Sheets

Figure 1

| P | Al | P | Al | P | Al | P | Al | P | Al |
|---|---|---|---|---|---|---|---|---|---|
| Al | P | Al | Si | Al | P | Al | P | Al | P |
| P | Al | P | Al | P | Al | Si | Al | P | Al |
| Al | P | Al | P | Al | Si | Si | Si | Al | P |
| P | Al | P | Al | P | Al | Si | Al | P | Al |
| Al | P | Al | Si | Al | P | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Si | Si | Al | P | Al | P |
| P | Al | Si | Si | Si | Al | P | Al | P | Al |
| Al | P | Al | Si | Al | P | Al | P | Al | P |
| P | Al | P | Al | P | Al | P | Al | P | Al |
| Al | P | Al | P | Al | P | Al | P | Al | P |

Figure 6(a) – SEM of product form Example 4.

Figure 6(b) – SEM of conventional SAPO-11 material

Figure 7

SILICOALUMINOPHOSPHATES HAVING AEL STRUCTURE, A METHOD FOR THEIR PREPARATION AND THEIR USE AS CATALYSTS FOR THE HYDROPROCESSING OF HYDROCARBON FEEDSTOCKS

This application claims the benefit of U.S. Provisional Application No. 60/086,681 May 26, 1998.

FIELD OF THE INVENTION

This invention relates to silicoaluninophosphates (SAPOs) having unique silicon distributions, a method for their preparation and their use as catalysts for the hydroprocessing of hydrocarbon feedstocks. More particularly, the new SAPOs, designated ECR-42 herein, have a high silica:alumina ratio and a beneficial silicon atom distribution.

BACKGROUND OF THE INVENTION

The preparation of crystalline silicoaluminophosphates is well known. U.S. Pat. No. 4,480,871 describes the preparation of crystalline, microporous silicoaluminophosphates by hydrothermal crystallization of silicoaluminophosphate gels containing a molecular structure-forming template. SAPOs are members of a class known as non-zeolitic molecular sieves. The SAPO molecular sieve has a framework of $AlO_4$, $SiO_4$ and $PO_4$ tetrahedra linked by oxygen atoms. The negative change in the network is balanced by the inclusion of exchangeable protons or cations such as alkali or alkaline earth metal ions. The interstitial spaces of channels formed by the crystalline network enables SAPOs to be used as molecular sieves in a manner similar to crystalline aluminosilicates, such as zeolites.

Accordingly, numerous microporous framework structures analogous to the aluminosilicate zeolites can be synthesized having an $AlPO_4$ composition and have been called ALPOs. A modified family of materials has been made by the substitution of $Si^{4+}$ for $Al^{3+}$ and $P^{5+}$ (SAPOs). Although the ALPO structures are neutral frameworks, the substitution of $Si^{4+}$ for $P^{5+}$ imparts a negative charge on the framework. By suitable choice of a cation, this can be translated into catalytic activity. However, alternate substitutions may be possible that may result in a disproportionately low exchange capacity. The exact nature of Si substitution into ALPO structures is complex and highly variable and may depend on both the topology of the ALPO/SAPO and the method of preparation. The result is that preferred catalysts may be made by a suitable choice of synthesis method. For example, SAPO-5 and SAPO-11 may be conventionally prepared in an aqueous solution or from microemulsions. The latter processes use hexanol and a cationic or neutral surfactant to a two-phase gel leading to the formation of a microemulsion.

The microemulsion process is a two-phase approach to preparing SAPOs attempts to reduce the amount of undesirable silica island formation by supplying the silicon from an organic phase to the aqueous phase at a low concentration during crystallization. The organic phase contains the organic solvent and organic silicon source, tetraethylorthosilicate, which is only slightly soluble in the aqueous phase. The aqueous phase is where crystallization occurs and contains the phosphorus and aluminum. It has been theorized that as the silicon is depleted from the aqueous phases by the growing SAPO crystals, it will be replenished from the organic phase, thereby forming a silicoaluminophosphate product having a more uniform distribution of silicon in the framework.

Conventional SAPO molecular sieves have application for a wide variety of uses, for example as catalysts. In this regard, conventional SAPOs may be used as catalysts in petroleum processing. For example, SAPO catalysts may be used in lubricating oil hydroconversion procedures, hydrocracking, dewaxing, and combinations thereof. In this regard, it is known that increasing Si concentration at first results in an increase in catalytic activity. However, increasing Si content beyond about 0.04 mole fraction in the framework, based on the total amount of silicon, aluminum, and phosphorus in the framework, provides no increase in activity, and may even lead to a decrease, depending on the specific distribution and clustering of the $Si^{4+}$ substituent.

In that the distribution of Si in the SAPO framework affects catalytic activity, the catalytic activity of SAPOs therefore depends on both the global composition and the Si distribution. Accordingly, SAPOs are defined not only by chemical composition and X-Ray Diffraction pattern, but also by $^{29}Si$ MAS NMR spectra which define the Si distributions.

On the basis of this last technique, it has been shown that when the SAPOs contain low amounts of Si, the silicon atoms are mostly isolated. However, when the Si content increases, Si islands start to appear, i.e., Si sites having silicon atoms and no aluminum atoms in neighboring lattice positions.

There remains a need, though, for improved silicoaluminophosphates for use in hydrocarbon processing, and in particular silicoaluminophosphates having an improved silicon distribution.

SUMMARY OF THE INVENTION

In one embodiment, the invention is a method for catalytically dewaxing a hydrocarbon, comprising contacting the hydrocarbon with a catalytically effective amount of a SAPO catalyst under catalytic conversion conditions, the SAPO catalyst being a molecular sieve with a framework tetrahedra of silicon, aluminum, and phosphorus, and having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among silicon sites in the framework tetrahedra, each site having a first, a second, a third, and a fourth next nearest neighbor position, and each next nearest neighbor position being independently occupied by one atom selected from silicon, and aluminum, and (b) the molecular sieve has a substantially smaller number of silicon sites having silicon atoms among all four next nearest neighbor positions than the conventional SAPO-11 having the same total silicon amount.

In another embodiment, the invention is a method for catalytically dewaxing a hydrocarbon comprising contacting the hydrocarbon with a catalytically effective amount of a SAPO catalyst under catalytic conversion conditions, the SAPO catalyst being a molecular sieve framework tetrahedra of silicon, aluminum, and phosphorus, the composition having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the molecular sieve has a first number of Si atoms coordinated as Si(4Si), (b) the conventional SAPO-11 with the Si amount has a second number of Si atoms coordinated as Si(4Si), and (c) the first number of Si atoms is substantially less than the second number of Si atoms.

BRIEF DESCRIPTION OF THE DRAWINGS

FIG. 3 shows the $^{29}$Si NMR spectra of conventionally prepared SAPO-11. Spectrum 3(a) shows a SAPO-11 of 5 molar percent Si having about ⅓ of the Si atoms located in silicon islands. Spectrum 3(b) is a SAPO-11 of 4 molar % Si having at most a small amount of Si located in Si islands, and spectrum 3(c) shows a SAPO-11 of 14 molar % Si having extensive Si island formation.

DETAILED DESCRIPTION OF THE INVENTION

The invention is based in part on the discovery that SAPO materials having the AEL topology and designated ECR-42 herein may be prepared with high silicon concentration and without undesirable silicon island fonnation. The invention is also based on the discovery that a SAPO precursor gel such as a silicoaluminophosphate gel may be formed from an aqueous synthesis solution containing no added alcohol or surfactant provided the co-solvent is a soluble species capable of maintaining a high dispersion of silica in a synthesis solution. While not wishing to be bound by any theory or model, the co-solvent is believed to inhibit polymerization of the highly dispersed silica species. The preferred methods therefore provide a SAPO molecular sieve containing Si in the tetrahedral framework at a concentration above 0.04 molar fraction (based on the total amount of aluminum, silicon, and phosphorus in the framework) and having a desirable Si distribution in the framework, resulting in high catalytic activity and selectivity.

In other words, it has been discovered that modifying the synthesis of a silicon-substituted aluminophosphate by changing the composition of the synthesis mixture, the synthesis conditions, or both, modifies the silicon distribution in the silicoaluminophosphate thus formed. This changed distribution of silicon may have a major beneficial influence on the catalytic activity of the silicoaluminophosphate.

Accordingly, when AEL-type molecular sieve materials are synthesized following the procedure described herein, the distribution of Si and therefore the total number and strength of acid sites in the molecular sieve framework is quite different, and much higher than those of previously reported forms of SAPO molecular sieves.

The preferred silicoaluminophosphate composition of this invention, ECR-42, has the topology AEL which corresponds to SAPO-11. The AEL topology is defined in the "*Atlas of Zeolite Structure Types,*" 4th Ed, by W. M. Meier, D. H. Olson and Ch. Baerlocher, Elsevier, 1996. Although the composition is isostructural with other AEL molecular sieve materials, it is a distinct molecular sieve composition because the silicon, aluminum, and phosphorus atoms are not arranged the same way as in conventional SAPO-11 molecular sieve. Those skilled in the art will recognize that two isostructural molecular sieves may be entirely different compositions having entirely different properties, depending on, for example, the nature and distribution of the constituent atoms.

Figure 1:
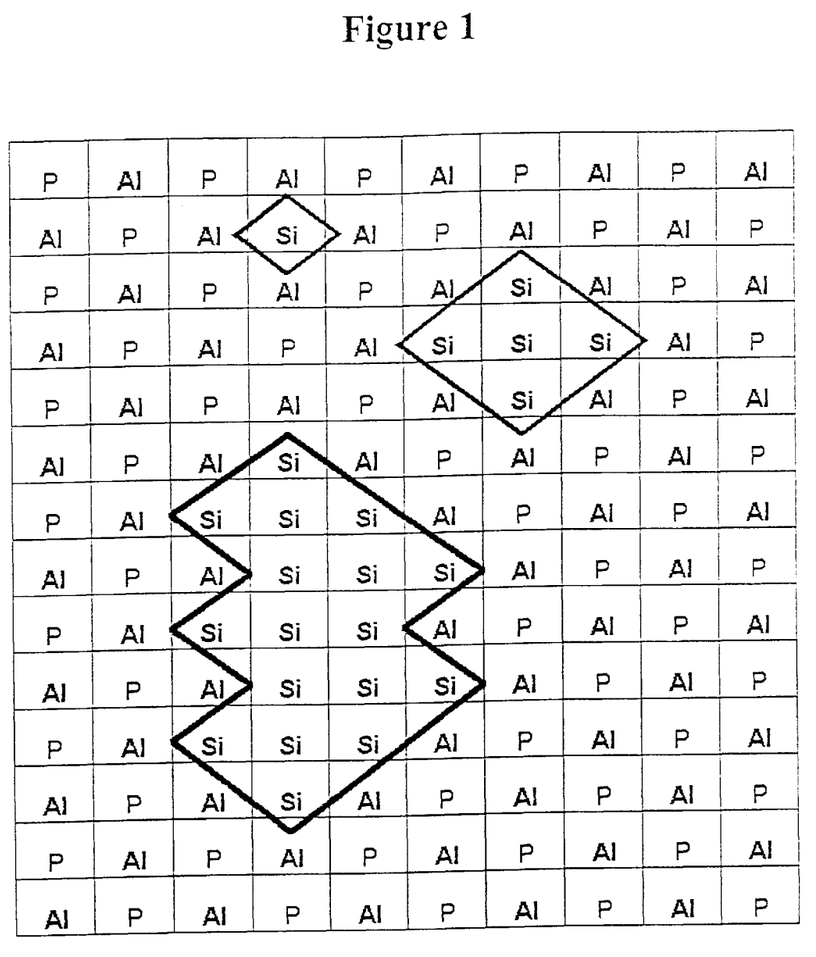
FIG. 1 schematically shows the type of silicon environments in SAPO-type molecular sieves.

Preferred molecular sieve compositions are physically different from other SAPO's having the AEL structure because the silicon atoms are distributed differently in the molecular sieve framework. The physical structure of the preferred composition (and its silicon distribution) is illustrated schematically in FIG. 1. While the actual structure is three dimensional and contains oxygen in addition to silicon, aluminum and phosphorus, the figure's atomic positions are represented on a two dimensional array and oxygen atoms are omitted for clarity. As is shown in the figure, each lattice site in the framework has four nearest neighbor lattice sites. In the preferred compositions, as with all AEL-type SAPOs, a lattice site occupied by a silicon 4+ cation, i.e., a "silicon site", ordinarily may not have a phosphorus 5+ cation as a nearest neighbor. The four nearest neighbor lattice sites may therefore be occupied by one silicon and three aluminum cations, two silicon and two aluminum cations, three silicon and one aluminum cations, four silicon cations, or four aluminum cations. As discussed, conventional AEL-type SAPOs with increased silicon concentration, above about 4 molar %, contain undesirable silicon islands, i.e., silicon atoms in the framework having four silicon atom nearest neighbors. The silicon atoms in the preferred composition are physically distributed so that the silicon island concentration is greatly reduced compared with conventional SAPO-11 (i.e., SAPO-11 prepared in accordance with the methods disclosed in the prior art) having the same total silicon concentration.

In a particularly preferred embodiment, the total molar fraction of silicon in the ECR-42 framework is greater than about 0.05, and the number of Si atoms having no Si nearest neighbor ranges from about 0 mol. % to about 100 mol. %, the number of Si atoms having one Si nearest neighbor ranges from about 5 mol. % to about 25 mol. %, the number of Si atoms having two Si nearest neighbors ranges from about 0 mol. % to about 35 mol. %, the number of Si atoms having three Si nearest neighbors ranges from about 0 mol. % to about 25 mol. %, and the number of Si atoms having four Si nearest neighbors ranging from about 0 mol. % to about 25 mol. %, the mol. % being based on the total silica in the ECR-42.

Preferably, the ECR-42 compositions have a Si content ranging from above about 4 mol. % to about 20 mol. %, more preferably from about 5 mol. % to about 15 mol. %, and still more preferably from about 7 mol. % to about 15 mol %, the silicon content being based on the total amount of Si present in the framework of the molecular sieve composition. Preferably, more than about 50 molar %, and more preferably more than about 90 molar % of the silicon atoms present in the framework do not have four silicon atoms as nearest neighbors in the framework.

The preferred molecular sieve compositions have both a desirably high silicon concentration and a desirable silicon atom dispersion (i.e. a smaller number of silicon islands than would be present in conventional SAPO-11 with the same silicon content) may be formed in accordance with conventional molecular sieve synthesis techniques. The preferred ECR-42 synthesis processes commence with the formation of a silicoaluminophosphate gel having the formula $X_1SURF:X_2TEMP:Al_2O_3:P_2O_5:X_3SiO_2:X_4H_2O:X_5SOL$ wherein SURF is a surfactant capable of forming a microemulsion between synthesis solution's organic and aqueous phases. While not wishing to be bound by any theory or model, it is believed that the surfactant helps to solubilize the organic tetraalkylorthosilicate silica source and also increases the available interface between the organic species and inorganic species in the synthesis gel resulting in an improvement in the final silica distribution in the silicoaluminophosphate product. Non-limiting examples of useful surfactants include one or more of long chain alkylamines such as hexadecylamine, tetradecylamine, dodecylamine, decylamine, or octylamine, or dimethyl alkylamine compounds such as dimethylhexadecylammine or dimethyloctylamine, or trimethylalkylammonium salts such as trimethylhexadecylammounium chloride.

TEMP is a template capable of structure directing to AEL such as di-n-propylamine, diisopropylamine, or diethylamine for forming the preferred ECR-42 silicoaluminophosphate molecular sieve.

SOL is a water-soluble organic co-solvent capable of solubilizing the organic silicon source. While not wishing to be bound, it is believed that solubilizing organic silicon sources such as a tetraalkylorthosilicate silicon source into the aqueous synthesis gel improves the final silicon distribution in the silicoaluminophosphate product. Non-limiting examples of useful water-soluble organic solvents include one or more of acetone, 1,2-propanediol, 1,3-propanediol, methanol, ethanol, propanol, isopropanol, butanol, or ethylene glycol.

The silicon source material may be any silicon species capable of being dispersed or dissolved in an aqueous synthesis solution. As discussed, where an organic silicon species is employed, a water- soluble organic solvent, SOL, is preferably employed. While not wishing to be bound by any theory or model, it is believed dispersing the silicon species in a low molecular weight form in the silicoaluminophosphate synthesis gel improves silicon distribution of the preferred ECR-42 material formed therefrom. Non-imiting examples of useful silicon source Mmaterials include one or more of tetraalkylorthosilicates such as tetramethylorthosilicate, tetraethylorthosilicate, tetrapropylorthosilicate, tetrabutylorthosilicate, and silsesquisiloxanes having up to twelve Si centers.

$X_1$ ranges from about 0 to about 0.5, $X_2$ ranges from about 0.1 to about 4, $X_3$ ranges from about 0.01 to about 2, $X_4$ ranges from about 10 to about 100, and $X_5$ ranges from about 0 to about 30. The silicoaluminophosphate gel may be formed in accordance with the following processes.

(I) Processes Using Surfactant and Water-soluble Co-solvent

Silicoaluminophosphate gels having the formula $X_1SURF:X_2TEMP:Al_2O_3:P_2O_5:X_3SiO_2:X_4H_2O:X_5SOL$ may be prepared by combining a phosphorus source such as $H_3PO_4$, ammonium phosphate, and mixtures thereof; water; and an aluminum source such as hydrated alumina, organo alumina, pseudo-boehmite, aluminum hydroxide, colloidal alumina, and mixtures thereof, and then adding the template in order to form a homogeneous alumino phosphate mixture. The $P_2O_5:Al_2O_3$ molar ratio in the alumino phosphate mixture preferably ranges from about 0.7 to about 1.3, and more preferably ranges from about 0.9 to about 1.1. The $TEMP:Al_2O_3$ molar ratio in the alumino phosphate mixture preferably ranges from about 0.1 to about 5, and more preferably from about 0.5 to about 3. A surfactant solution of the surfactant, the—water-soluble organic solvent, and water may then be added to the alumino phosphate mixture along with the organic silicon source and water (if necessary to obtain the desired value of $X_4$) in order to form a synthesis solution having a $SURF:Al_2O_3$ molar ratio preferably ranging from about 0 to about 0.5, and more preferably ranging from about 0.05 to about 0.3. The relative amounts of the ingredients for the synthesis solution may be calculated from the desired values of $X_1$ through $X_5$. The $SOL:Al_2O_3$ molar ratio in the synthesis solution preferably ranging from about 0 to about 30, and more preferably ranging from about 4 to about 20, and the $SiO_2:Al_2O_3$ molar ratio preferably ranging from about 0.01 to about 2.0, and more preferably ranging from about 0.1 to about 0.8. The synthesis solution may then be subjected to gel formation conditions in order to provide the silicoaluminophosphate gel. The ingredients of the synthesis solution, surfactant solution, and alumino phosphate mixture may be mixed in any order. For example, in an alternative embodiment the organic silicon source may be added to a mixture of phosphoric acid and the water-soluble organic solvent. The template and the surfactant may then be added, with the water and aluminum source being added last.

Preferred silicoaluminophosphate crystallization conditions for forming the ECR-42 molecular sieve from the gel include heating the gel in a microwave autoclave for a time sufficient to crystallize the gel. Lower temperature and shorter crystallization times are preferred because such conditions may prevent the formation of undesirable products. Accordingly, the preferred heating times range from about 1 minute to about 5 days, at a temperature ranging from about 100° C. to about 250° C., and at a pressure ranging from about 0 bar to about 70 bar. In cases where other products, un-reacted gel, or a mixture thereof is present at the conclusion of the reaction, the molecular sieve may be recovered by a separation process such as centrifugation. The process may also include conventional product washing and drying such as an ethanol rinse, followed by a water rinse, followed by air oven drying at a temperature ranging from about ambient temperature to about 200° C. It should be noted that conventional heating, in for example an air oven or an externally heated autoclave, may be substituted for microwave heating in this process, and that a substantially pure ECR-42 molecular sieve composition having the AEL-topology will result with either heating method. When conventional heating is used, the temperature preferably ranges from about 100° C. to about 250° C., and more preferably from 150° C. to about 200° C.

(II) Processes Using Surfactant, Hexanol Co-solvent and Microwave Heating

Silicoaluminophosphate gels having the formula $X_1SURF:X_2TEMP:Al_2O_3:P_2O_5:X_3SiO_4:X_2H_2O:X_5SOL'$ wherein SOL' is a relatively water insoluble organic solvent including solvent mixtures capable forming a microemulsion with water and a surfactant, and including mixtures thereof, may be prepared by according to the method (I) above, except that the water insoluble organic solvent SOL' is substituted for the water-soluble solvent SOL. But for the solvent substitution, the molar ratios of the ingredients in the alumino phosphate mixture and the synthesis solution are as set forth in method (I), and as in that method, the mixing order is not critical.

The preferred ECR-42 molecular sieve composition may be formed from the gel in accordance with the steps set forth in process (I). It should be noted that conventional heating may result in the presence of SAPO-41 material in the molecular sieve composition.

(III) Processes Using Ethanol with Water-soluble Co-solvent and No Added Surfactant Silicoaluminophosphate gels of stoichiomet:

$X_2TEMP:Al_2O_3:P_2O_5:X_3SiO_2:X_4H_2O:X_5SOL$ may be prepared by a method identical to method (I), above, except that no surfactant solution is used. An aqueous solution of water, the water-soluble organic solvent, and the silicon source is used instead of the surfactant solution. But for the absence of the surfactant, the molar ratios of the ingredients in the alumino phosphate mixture and the synthesis solution are as set forth in method (I), and as in that method, the mixing order of the ingredients is not critical.

The preferred ECR-42 molecular sieve composition may be formed from the gel in accordance with the steps set forth in process (I).

(IV) Processes Using an Organic Silicon Source and no Added Surfactant or Water-soluble Organic Cosolvent Silicoaluminophosphate gels of stoichiometry:

$X_2TEMP:Al_2O_3:P_2O_5:X_3SiO_2:X_4H_2O$ may be prepared by a method identical to method (I), above, except that no surfactant and no co-solvent are employed. An aqueous dispersion of water and a water-dispersible silicon source, such as TEOS, and mixtures thereof, is used instead of the surfactant solution.

But for the absence of the surfactant, the molar ratios of the ingredients in the alumino phosphate mixture and the synthesis solution are as set forth in method (I), and as in that method, the mixing order of the ingredients is not critical.

The preferred ECR-42 molecular sieve composition may be formed from the gel in accordance with the steps set forth in process (I). The product may contain SAPO-31.

(V) Processes for Forming SAPO-11 Using Colloidal Silica with No Added Surfactant and No Added Solvent Silicoaluminophosphate gels of stoichiometry:

$X_2TEMP:Al_2O_3:P_2O_5:X_3SiO_2:X_4H_2O$ may be prepared by a method identical to method (I), above, except that no surfactant solution is used. An aqueous dispersion of water and the colloidal or fumed silica is used instead of the organic silicon source and surfactant solution. But for the absence of the surfactant and co-solvent, the molar ratios of the ingredients in the alumino phosphate mixture and the synthesis solution are as set forth in method (I), and as in that method, the mixing order of the ingredients is not critical.

A SAPO-11 molecular sieve composition may be formed from the gel in accordance with the steps set forth in process (I). The product may contain SAPO-31.

Molecular sieve materials prepared in accordance with these methods are useful as catalytic materials. A non-limiting description of the catalytic nature and some catalytic uses of such materials is as follows.

As is known to those skilled in the art, molecular sieve materials may possess an intrinsic or added catalytic finctionality, and such materials are frequently referred to as "molecular sieve catalysts". Additional catalytic functionalities may be provided for molecular sieve materials by conventional methods. Such methods are applicable to the molecular sieves of this invention, and may be summarized as follows.

Accordingly, the molecular sieve material formed from the gel as set forth above may be calcined to remove the template. The sample may then be allowed to cool, preferably in the presence of a dessicator, and then loaded with a catalytic species such as by conventional techniques.

The catalytic molecular sieve compositions of this invention are useful for at least hydrocarbon isomerization, hydrotreating, and hydrocracking, especially hydrodewaxing. The molecular sieve compositions of this invention have a dramatically increased catalytic activity for such processes over AEL type SAPO molecular sieves prepared by conventional techniques.

More specifically, the molecular sieves of this invention may be used in applications including, but not limited to catalytic dewaxing and isodewaxing/isomerization.

Isodewaxing involves the conversion of high boiling feedstocks boiling in the lubricating oil range to lower boiling products primarily by isomerization cracking and such-like reactions. Thus long chain normal and slightly branched paraffins are converted to iso-paraffins while minimizing the amount of cracking to products boiling outside the lube oil range.

Feedstocks to the isodewaxing process include distillates, raffinates, synthetics such as Fischer Tropsch feeds, deasphalted oils, and solvent dewaxed oils, said feeds boiling in the range of about 177° C. to about 700° C., preferably about 260° C. to about 650° C. The feeds may be hydroprocessed or non-hydroprocessed and may have wax contents from about 0 to about 100%.

Feedstocks may be contacted with the molecular sieve catalysts of this invention in the presence of hydrogen gas at a temperature of about 250° C. to about 430° C., preferably about 280° C. to about 400° C., a hydrogen pressure of about 400 psig to about 3000 psig, preferably about 600 psig to about 2500 psig, a liquid hourly space velocity of about 0.1 to 30 v/v/h, preferably about 0.3 to 7 v/v/h and a hydrogen gas treat rate of about 400 to about 10,000 scf/b, preferably about 1000 to about 5,000 scf/b.

Preferably, such catalyst may be loaded with a hydrogenation component, i.e., an added catalytic functionality, that contains at least one metal chosen from Groups VIII, VIB and IB, preferably Group VIII noble metals, especially Pt or Pd or combinations of both. The amount of metal will be from about 0.1 to about 20 wt. % based on catalyst, preferably about 0.15 to about 5 wt. %. The catalyst may also contain an inorganic oxide binder such as alumina, silica-alumina, zirconia, silica, silica-magnesia, titania and the like.

Hydrocracking includes both conventional hydrocracking and selective hydrocracking. In conventional hydrocracking, the feedstock is cracked in the presence of an acidic catalyst such as silica-alumina or a large pore zeolite under hydrocracking conditions. The acidic catalyst may be combined with molecular sieve catalyst of this invention in the hydrocracking zone in order to, for example, influence the hydrocracked product distribution. Accordingly, using the molecular sieve catalysts of this invention, alone or in combination with a conventional hydrocracking catalyst, may result under appropriate conditions in a naphtha product desirably containing a higher percentage of isoparaffins.

Conventional hydrocracking catalysts are well known in the art and include silica-alumina, alumina and zeolites such as zeolite Y, zeolite X, zeolite beta, mordenite, offretite and the like. The hydrocracking catalyst will also contain a Group VI and/or Group VIII metals.

In a preferred hydrocracking process using the molecular sieve catalysts of this invention, the feedstocks are contacted with a hydrocracking catalyst and the molecular sieve catalyst in the presence of hydrogen gas at a temperature of about 250° C. to about 430° C., preferably about 280° C. to about 400° C., a hydrogen pressure of about 400 psig to about 3000 psig, preferably about 600 psig to about 2500 psig, a liquid hourly space velocity of about 0.1 to about 30 v/v/h, preferably about 0.3 to about 7 v/v/h and a hydrogen gas treat rate of about 400 to about 10,000 scf/b, preferably about 1000 to about 5,000 scf/b.

The molecular sieve compositions of this invention may be used in catalytic dewaxing processes, preferably in combination with a conventional dewaxing catalyst. Such processes may under appropriate conditions the isomerization and selective hydrocracking functions in order to control the product's pour point and viscosity index. Conventional catalytic hydrodewaxing catalysts are typically intermediate pore zeolites such as ZSM-5, ZSM-22, ZSM-23, ferrierite, ZSM-35, and the like. The catalysts may be in a layered configuration or may be staged in separate reactors. It is preferred to have the feedstock contact the molecular sieve catalyst initially, followed by contacting with the hydrodewaxing catalyst, although the reverse may be used if desired.

Preferred dewaxing conditions include a temperature of about 250° C. to about 430° C., preferably about 280° C. to about 400° C., a hydrogen pressure of about 400 psig to about 3000 psig, preferably about 600 psig to about 2500 psig, a liquid hourly space velocity of about 0.1 to about 30 v/v/h, preferably about 0.3 to about 7 v/v/h and a hydrogen gas treat rate of about 400 to about 10,000 scf/b, preferably about 1000 to about 5,000 scf/b.

Either or both catalytic components may contain a hydrogenation component which is at least one metal chosen from Groups VIII, VIB and IB, preferably Group VIII noble metals, especially Pt or Pd or combinations of both. The catalyst may include an inorganic oxide binder such as clays, silica, silica-alumina, alumina, zirconia, silica-magnesia, titania, silica-titania, silica zirconia, alumina-titania and the like.

In summary, it has been discovered that when AEL-type molecular sieves are synthesized in accord with the preferred methods described herein, that the distribution of Si and therefore the total number and strength of acid sites is quite different, and much higher, than those of conventional SAPO-11. It has also been discovered that the molecular sieves of this invention are extremely active and selective for carrying out reactions of hydrocarbon such as alkylation, disproportionation, oligomerization, naphtha cracking and other reactions known to involve molecular sieve catalysts, especially the catalytic dewaxing and isodewaxing of hydrocarbon feeds containing paraffins.

The invention is further exemplified by the following non-limiting examples.

EXAMPLES

I. Preparation of the Preferred ECR-42 Molecular Sieves

Example 1

Preparation of ECR-42 using surfactant, ethanol co-solvent, and microwave heating.

Figure 4:
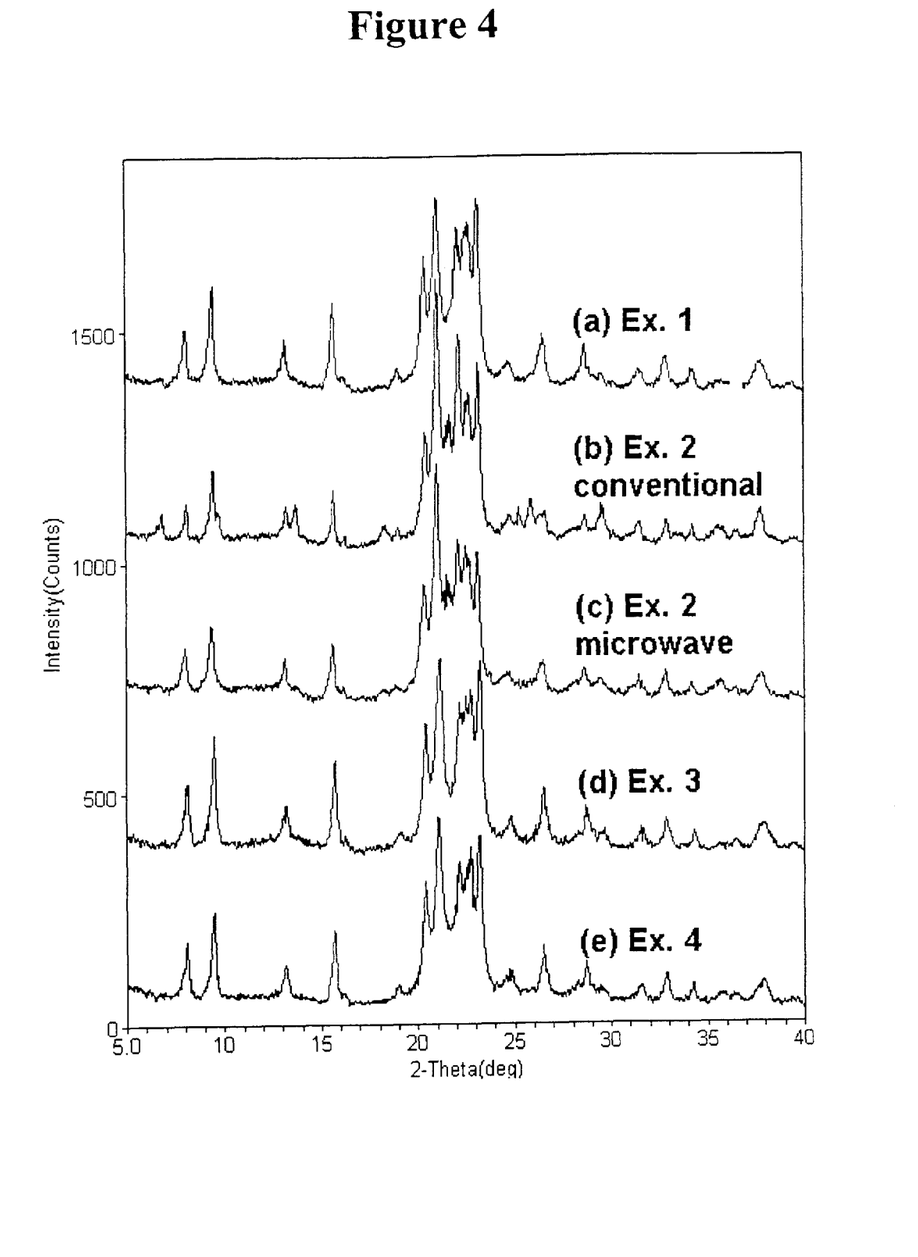
FIG. 4 shows powder x-ray diffraction data for the AEL-type SAPOs prepared in examples 1 through 4.

A silicoaluminophosphate gel of stoichiometry:

0.16CA:DPA:$Al_2O_3$:$P_2O_5$:0.2$SiO_2$:50.3$H_2O$:7.3ethanol (where CA is hexadecylamine) was prepared by mechanically mixing together 28.6 grams of $H_3PO_4$(85%), 25 grams of water and 17 grams of Catapal B alumina (Vista Chemical Co., Houston, Tex. 74% $Al_2O_3$, 26% $H_2O$ for 45 min. in a 500 ml Teflon bottle until homogenous. To this mixture was added 12.7 grams of DPA, and the mixture was then stirred for 30 minutes. A surfactant solution was prepared by mixing 2.4 grams of hexadecylamine in 20.8 grams of ethanol and 12.5 grams of water. This solution was added to half of the di-n-propylamine/aluminophosphate mixture along with 2.6 grams of TEOS and 11.2 grams of water. The resulting mixture was stirred for about 3 min. in a 125 ml blender. This gel was divided between three CEM XP-1500 Teflon microwave autoclaves (about 28.5 grams each), available from CEM Corp., Matthews, N.C. The three autoclaves were heated for 5 min. in a microwave oven to a pressure of 485 psi. After 5, 30 and 60 min. at 485 psi the samples were removed from the oven. The ECR-42 products were recovered by centrifugation and washed twice with ethanol and then twice with de-ionized water. The resulting products were dried in an air oven at 115° C. and the powder X-ray diffraction pattern measured which showed the products to be pure SAPO-11, see FIG. 4(a). Elemental analysis of the 60 min. sample gave: 17.3% Al; 17.0% P; 1.68% Si, representing a product stoichiometry of $Si_{0.05}Al_{0.51}P_{0.44}$.

Example 2

Preparation of ECR-42 Using Surfactant, Hexanol Co-solvent, and Microwave Heating.

A silicoaluminophosphate gel of stoichiometry:

0.16CA:DPA:$Al_2O_3$:$P_2O_5$:0.4$SiO_2$:39$H_2O$:4.5hexanol (where CA is hexadecylamine) was prepared by mechanically mixing together 28.6 grams of $H_3PO_4$(85%), 25 grams of water and 17 grams of Catapal B alumina (Vista, 74% $Al_2O_3$, 26% $H_2O$) for 2 hr. in a 500 ml Teflon bottle until homogenous. To this mixture was added 12.7 grams of DPA and the mixture was then stirred for 30 minutes. A surfactant solution was prepared by mixing 4.8 grams of hexadecylamine in 56.9 grams of hexanol and 25 grams of water. This solution was added to the di-n-propylamine/ aluminophosphate mixture along with 10.3 grams of TEOS and 22.3 grams of water. The resulting mixture was stirred for about 3 min. in a 125 ml blender. This gel was divided between two 125 ml Teflon-lined autoclaves and a CEM XP-1500 Teflon microwave autoclave (about 28.5 grams). The two autoclaves were heated at 195° C. for 24 and 40 hrs. in a conventional oven. The microwave autoclave was heated for 5 min. in a microwave oven to a pressure of 485 psi. After 60 min. at 485 psi the sample was removed from the oven. The products were recovered by centrifugation and washed twice with ethanol and then twice with de-ionized water. The resulting ECR-42 products were dried in an air oven at 115° C. and the powder X-ray diffraction pattern measured showed that the product of the microwave heating was pure SAPO-11 (FIG. 4(c)) and the product of the conventionally heated samples to be SAPO-11 and SAPO-41 (FIG. 4(b)). Elemental analysis of the microwave heated sample gave: 14.5% Al; 16.4% P; 2.84% Si, representing a product stoichiometry of $Si_{0.09}Al_{0.46}P_{0.45}$ and the conventionally heated sample (40 hrs.) gave 15.4% Al; 16.4% P; 3.36% Si, representing a product stoichiometry of $Si_{0.10}Al_{0.47}P_{0.43}$.

Example 3
Preparation of ECR-42 using surfactant, ethanol co-solvent, and microwave heating.
A silicoaluminophosphate gel of stoichiometry:

0.16CA:DPA:Al$_2$O$_3$:P$_2$O$_5$:0.2SiO$_2$:39.1H$_2$O:7.3 ethanol

(where CA is hexadecylamine) was prepared by mechanically mixing together 71.5 grams of H$_3$PO$_4$(85%), 62.5 grams of water and 42.4 grams of Catapal B alumina (Vista, 74% Al$_2$O$_3$, 26% H$_2$O) for 45 min. in a 1000 ml Teflon bottle until homogenous. To this mixture was added 31.7 grams of DPA and the mixture was then stirred for 30 minutes. A surfactant solution was prepared by mixing 12 grams of hexadecylamine in 104 grams of ethanol and 62.5 grams of water. This solution was added to the di-n-propylamine/aluminophosphate mixture along with 13 grams of TEOS and 56 grams of water. The resulting mixture was stirred for about 3 min. in a 250 ml blender. One half of this gel was divided between five CEM XP-1500 Teflon microwave autoclaves (about 42.5 grams each). The five autoclaves were heated for 10 min. in a microwave oven to a pressure of 485 psi. After 30 min. at 485 psi the samples were removed from the oven. The ECR-42 products were combined and then recovered by centrifugation and washed twice with ethanol and then twice with de-ionized water. The resulting product was dried in an air oven at 115° C. and the powder X-ray diffraction pattern measured which showed the product to be pure SAPO-11. See FIG. 4(d). Elemental analysis gave: 15.96% Al; 17.3% P; 1.638% Si, representing a product stoichiometry of $Si_{0.05}Al_{0.49}P_{0.046}$.

Example 4
Preparation of ECR-42 using surfactant, ethanol co-solvent and microwave heating.
A silicoaluminophosphate gel of stoichiometry:

0.16CA:DPA:Al$_2$O$_3$:P$_2$O$_5$:0.4SiO$_2$:39.1H$_2$O:7.3 ethanol (where CA is hexadecylamine) was prepared by adding 6.5 grams more of TEOS to the second half of the gel prepared in Example 3. After thoroughly homogenizing in a blender this gel was divided between five CEM XP-1500 Teflon microwave autoclaves (about 42.5 grams each. The five autoclaves were heated for 10 min. in a microwave oven to a pressure of 485 psi. After 30 min. at 485 psi the samples were removed from the oven. The ECR-42 products were combined and then recovered by centrifugation and washed twice with ethanol and then twice with de-ionized water. The resulting product was dried in an air oven at 115° C. and the powder X-ray diffraction pattern measured which showed the product to be pure SAPO-11. See FIG. 4(e). Elemental analysis gave: 15.23% Al; 17.2% P; 2.795% Si, representing a product stoichiometry of $Si_{0.08}Al_{0.46}P_{0.46}$.

Figure 5:
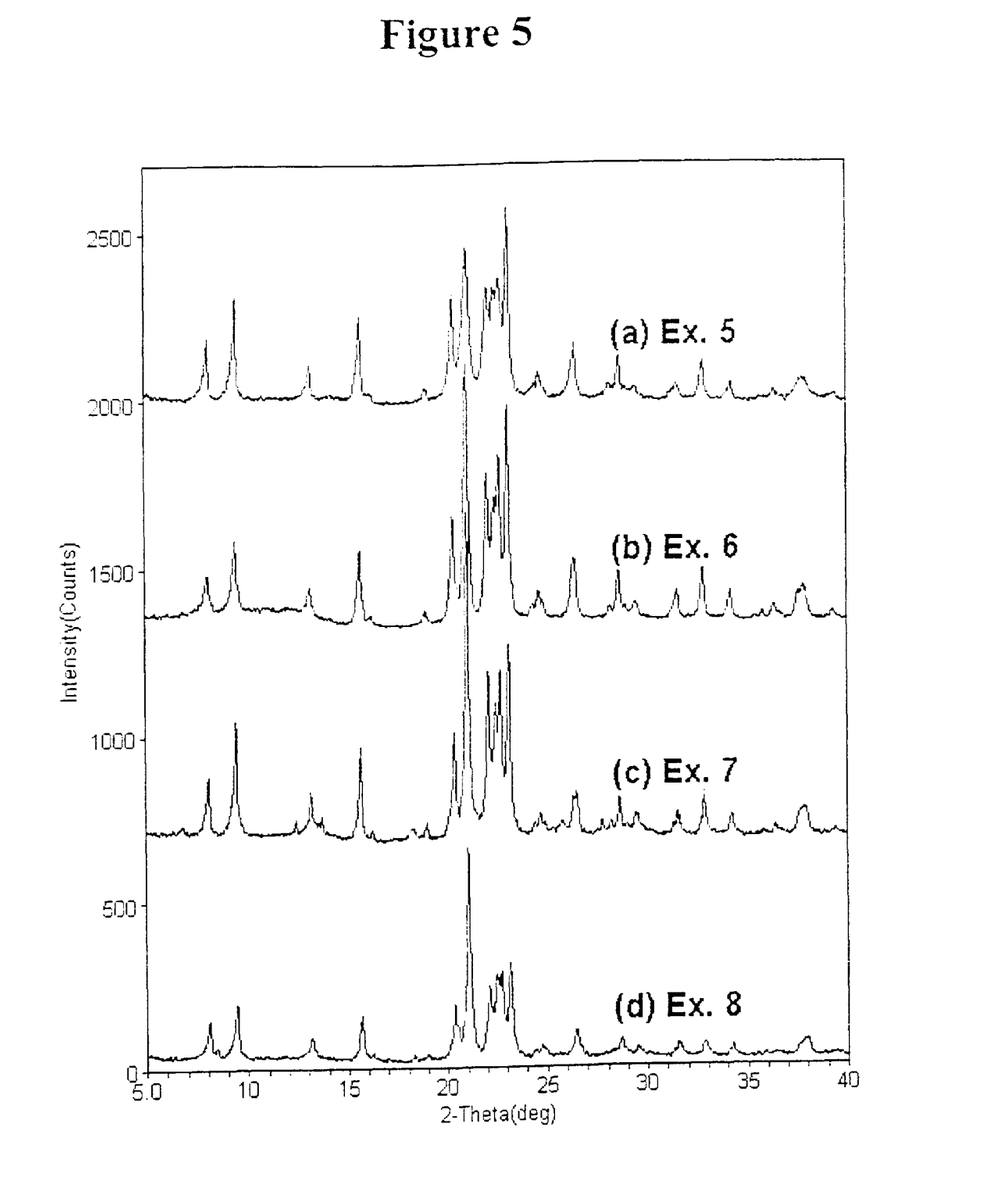
FIG. 5 shows powder x-ray diffraction data from AEL-type SAPOs of examples 5 through 8.

Example 5
Preparation of ECR-42 using surfactant, ethanol co-solvent, and conventional heating.
A silicoaluminophosphate gel of stoichiometry:

0.16CA:2DPA:Al$_2$O$_3$:P$_2$O$_5$:0.4SiO$_2$:40H$_2$O7.5 ethanol (where CA is hexadecylamine) was prepared by mixing together 25.4 grams of H$_3$PO$_4$(85%), 35 grams of water, and 15.2 grams of Catapal A alumina (Vista, 74% Al$_2$O$_3$, 26% H$_2$O) for 2 min. in a 250 ml plastic beaker. To this mixture was added 22.3 grams of DPA and the mixture was then stirred for 3 minutes. A surfactant solution was prepared by mixing 4.25 grams of hexadecylamine in 38.1 grams of ethanol for thirty minutes. This solution was added to the di-n-propylamine/aluminophosphate mixture along with 9.18 grams of TEOS and 30.6 grams of water. The resulting mixture was homogenized for about 5 min. in a 250 ml blender. About 80 g of this gel was placed in a 125 Teflon lined autoclave. The autoclave was heated for 24 hours in an air oven at 195° C. After cooling, the ECR-42 product was recovered by centrifugation and washed twice with ethanol and then twice with de-ionized water. The resulting product was dried in an air oven at 115° C. and the powder X-ray diffraction pattern measured which showed the product to be pure SAPO-11. See FIG. 5(a). Elemental analysis gave: 17.2% Al; 17.1% P; 3.052% Si, representing a product stoichiometry of $Si_{0.084}Al_{0.491}P_{0.425}$.

Example 6

Preparation of ECR-42 using TEOS, ethanol co-solvent and conventional heating.

A silicoaluminophosphate gel of stoichiometry:

2DPA:Al$_2$O$_3$:P$_2$O$_5$:0.4SiO$_2$:40H$_2$O7.5 ethanol was prepared by mixing together 28.9 grams of H$_3$PO$_4$ (85%), 40 grams of water and 17.3 grams of Catapal A alumina (Vista, 74% Al$_2$O$_3$, 26% H$_2$O) for 2 min. in a 250 ml plastic beaker. To this mixture was added 25.4 grams of DPA and the mixture stirred for 3 minutes. To the di-n-propylamine/aluminophosphate mixture was added 43.3 grams of ethanol with 10.4 grams of TEOS and 34.7 grams of water. The resulting mixture was homogenized for about 5 min. in a 250 ml blender. About 80 g of this gel was placed in a 125 Teflon lined autoclave. The autoclave was heated for 24 hours in an air oven at 195° C. After cooling, the ECR-42 product was recovered by centrifuigation and washed once with ethanol and then three times with de-ionized water. The resulting product was dried in an air oven at 115° C. and the powder X-ray diffraction pattern measured which showed the product to be pure SAPO-11. See FIG. 5(b). Elemental analysis gave: 17.94% Al; 20.1% P; 2.56% Si, representing a product stoichiometry of $Si_{0.065}Al_{0.473}P_{0.462}$.

Example 7
Preparation of ECR-42 Using TEOS and Conventional Heating.

A silicoaluminophosphate gel of stoichiometry:

1.5DPA:$Al_2O_3$:$P_2O_5$:0.4 $SiO_2$:50$H_2O$ was prepared by mixing together 25.1 grams of $H_3PO_4$ (85%), 36 grams of water and 15 grams of Catapal A alumina (Vista, 74% $Al_2O_3$, 26% $H_2O$) for 2 min. in a 250 ml plastic beaker. To this mixture was added 16.5 grams of DPA, and the mixture was stirred for 3 minutes. To the di-n-propylamine/aluminophosphate mixture was added 9.1 grams of TEOS (tetraethylorthosilicate) and 48.4 grams of water. The resulting mixture was homogenized for about 5 min. in a 250 ml blender. One half of this gel was placed in a 125 Teflon-lined autoclave. The autoclave was heated for 24 hours in an air oven at 220° C. After cooling, the ECR-42 product was recovered by centrifuigation and washed four times with de-ionized water. The resulting product was dried in an air oven at 115° C. and the powder X-ray diffraction pattern measured which showed the product to be SAPO-11 and SAPO-41. See FIG. 5(c). Elemental analysis gave: 18.8% Al; 19.7% P; 2.70% Si, representing a product stoichiometry of $Si_{0.067}Al_{0.49}P_{0.445}$.

Example 8
Preparation of SAPO-11 using colloidal Silica.

A silicoaluminophosphate gel of stoichiometry:

1.5DPA:$Al_2O_3$:$P_2O_5$:0.4$SiO_2$:50$H_2O$ was prepared by mixing together 31.4 grams of $H_3PO_4$ (85%), 80 grams of water and 18.8 grams of Catapal B alumina (Vista, 74% $Al_2O_3$, 26% $H_2O$) and mechanically stirring for 0.5 hour in a 500 ml Teflon bottle. To this mixture was added 20.7 grams of DPA (di-n-propylamine) and 8.19 g solution of aqueous colloidal silica (duPont Ludox AS-40, 40% $SiO_2$) and stirred for 1.5 hours. Finally, 20.9 grams of water were added, and the resulting mixture was homogenized for about 5 min. in a 250 ml blender. This gel was divided between two 125 Teflon-lined autoclaves. The autoclaves were heated for 24 hours in an air oven at 195° C. After cooling, the products were combined and then recovered by centrifugation and washed four times with de-ionized water. The resulting product was dried in an air oven at 115° C. and the powder X-ray diffraction pattern measured which showed the product to be SAPO-11 and SAPO-31. See FIG. 5(d). Elemental analysis gave a product stoichiometry of $Si_{0.056}Al_{0.502}PO_{0.442}$.

Example 9
Preparation of comparative bi-metallic catalyst.

A commercially available SAPO-11 having a stoichiometry of $Si_{0.05}Al_{0.48}P_{0.47}$ was loaded with 0.5 wt. % platinum in accordance with conventional catalyst loading techniques.

Example 10
Decane reactivity test.

The products of examples 1,2, 3, and 4 were conventionally loaded with 0.5% (wt % ?) and then pilled, lightly crushed, and then sieved to a particle size of 0.85 to 2.0 mm. The samples were dried for at least 30 minutes in a 250° C. oven and then 0.500 gram portions were mixed with 5.00 grams of 0.25–0.60 mm quartz chips. The catalyst charge was then loaded into a 1 cm diameter, stainless steel, downflow automated reactor, equipped with an on-line, gas chromatogram containing a 50 meter capillary column. Samples were pretreated by ramping to 150° C. and holding for 30 minutes under a flow of 200 SCCM dry nitrogen. The gas was then switched to hydrogen and the temperature ramped to 350° C. and then held at 350° C. for 60 minutes to reduce the platinum. The temperature was reduced to 240° C. and the decane conversion measured at a WHSV of 29, a total pressure of 200 psig, and a $H_2$:feed ratio of 10. The conversion of decane was measured up to 400° C. in 20° C. increments after equilibrating for 30 minutes at each temperature. The results of the decane reactivity test are given in Table 1. Isomerization selectivity is given as wt. of $C_{10}$ isomer products and wt. of $C_{10}$ isomer products+wt. of cracked products interpolated at a conversion level of 50% decane conversion.

TABLE 1

| Catalyst | Decane Conversion at 320° C. | Isomerization Selectivity at 50% Conversion |
| --- | --- | --- |
| Ex. 1 | 51% | 92% |
| Ex. 2 | 41% | 87% |
| Ex. 3 | 62% | 91% |
| Ex. 4 | 74% | 93% |
| Comparative Ex. 9 | 30% | 81% |

The results of the decane reaction test clearly show the improved activity and selectivity of the microwave heated, surfactant prepared molecular sieve catalysts of the present invention over conventional SAPO-11 catalyst.

Example 11
Decane Reactivity Test.

The products of examples 5, 6, and 7 were conventionally loaded with 0.5 wt. % Pt and then subjected to the decane reactivity test in a manner similar to example 10. The results of the decane reactivity test are given in Table 2.

TABLE 2

| Catalyst | Decane Conversion at 320° C. | Isomerization Selectivity at 50% Conversion |
| --- | --- | --- |
| Ex. 5 (surf./ethanol/TEOS) | 58% | 91% |
| Ex. 6 (ethanol/TEOS) | 78.6% | 91% |
| Ex. 7 (TEOS) | 62.8% | 90% |
| Comparative Ex. 9 | 30% | 81% |

The results of the decane reactivity test clearly shows the advantage of using TEOS and optionally ethanol as a co-solvent to prepare very active molecular sieve catalysts as compared to conventionally prepared materials.

Example 12
Dewaxing a hydrocracker distillate.

TABLE 3

| Properties of Hydrocracker Distillate | |
| --- | --- |
| Viscosity, cSt at 100° C., | 3.765 |
| Viscosity, cSt at 60° C., | 8.941 |
| VI | 119 |
| Wax Content, wt % | 22.4 |
| Boiling Range, (5/95%), ° C. | 325–475 |
| Pour point, ° C. | 34 |

A sample of ECR-42 prepared according to this invention was loaded with 0.5 wt. % Pt using platinum tetraamine dinitrate before being intermixed in a 3:1 wt ratio with alumina which had been independently loaded with 0.5 wt. % Pt.

This catalyst was then used to hydrodewax the hydrocracker distillate in Table 3 under the conditions shown in Table 4. Table 4 also shows the properties of the products from the test as a function of Average Reactor Temperature and illustrates the ability of this catalyst for lubricant hydrodewaxing versus solvent dewaxing.

TABLE 4

| | | A | | |
|---|---|---|---|---|
| Catalyst (wt. %) | | Solvent Dewaxing | 0.5 wt. % Pt ECR-42/0.5 wt. % Pt alumina (3:1 wt ratio) | |
| Conditions | Avg. Reactor Temperature, ° C. | | 309 | 324 |
| | Pressure, psig | | 1000 | |
| | v/v/h | | 1.0 | |
| | T G Rate, scf/B | | 2500 | |
| Product Properties | | | | |
| 350° C.+, Yield | | 81.4 | 81.4 | 80.7 |
| Viscosity, cSt at 100° C. | | 3.845 | 4.039 | 4.063 |
| Viscosity, cSt at 40° C. | | 17.829 | 19.410 | 19.675 |
| VI | | 107 | 106 | 105 |
| Pour Point, ° C. | | −21 | −21 | −25 |
| Cloud Point, ° C. | | | −13 | −18 |

Examples 13

Preparation of ECR-42 Using Various Alcohol Co-solvents and Tetraalkylorthosilicates.

A series of silicoaluminophosphate gels of stoichiometry:

$$X_1CA:2\ DPA:Al_2O_3:P_2O_5:0.4SiO_2:40\ H_2O:X_5\ SOL$$

where CA is hexadecylamine and DPA is di-n-propylamine) were prepared by mixing together the appropriate amounts of $H_3PO_4$ (85%), water and Catapal A alumina (Vista, 74% $Al_2O_3$, 26% $H_2O$) for 2 min. in a 250 ml plastic beaker. To this mixture was added the appropriate amount of DPA (di-n-propylamine) and the mixture stirred for 3 minutes. Then the appropriate amount of alcohol, tetraalkylorthosilicate and water were added to obtain the stoichiometry as indicated in Table 1. The resulting mixtures were homogenized for about 5 min. in a 250 ml blender. One half of this mixture was transferred to 125 Teflon-lined autoclave. To the other half was mixed in 1.5 grams of hexadecylamine and also transferred to 125 Teflon-lined autoclave. The autoclaves were heated for 24 hours in an air oven at 195° C. After cooling the product was recovered by centrifugation and washed twice with ethanol and then twice with de-ionized water. The resulting products were dried in an air oven at 115° C. and the powder X-ray diffraction patterns measured which showed the products to be pure ECR-42. Elemental analyses and product stoichiometries are listed in Table 6.

TABLE 5

| Experimental Number | $X_1$ | $X_5$ | SOL | Si Source |
|---|---|---|---|---|
| 9 | 0 | 11.5 | methanol | tetraethylorthosilicate |
| 10 | .16 | 11.5 | methanol | tetraethylorthosilicate |
| 11 | 0 | 6.1 | n-propanol | tetraethylorthosilicate |
| 12 | .16 | 6.1 | n-propanol | tetraethylorthosilicate |
| 13 | 0 | 6.1 | i-propanol | tetraethylorthosilicate |
| 14 | .16 | 6.1 | i-propanol | tetraethylorthosilicate |
| 15 | 0 | 5.0 | n-butanol | tetraethylorthosilicate |
| 16 | .16 | 5.0 | n-butanol | tetraethylorthosilicate |

TABLE 5-continued

| Experimental Number | $X_1$ | $X_5$ | SOL | Si Source |
|---|---|---|---|---|
| 17 | 0 | 8 | ethanol | tetramethylorthosilicate |
| 18 | .16 | 8 | ethanol | tetramethylorthosilicate |
| 19 | 0 | 8 | ethanol | tetrapropylorthosilicate |
| 20 | .16 | 8 | ethanol | tetrapropylorthosilicate |

TABLE 6

| Experiment Number | % Si | % Al | % P | Molar Si | Molar Al | Molar P |
|---|---|---|---|---|---|---|
| 9 | 3.213 | 18.40 | 19.37 | 0.080 | 0.480 | 0.440 |
| 10 | 3.870 | 17.63 | 13.68 | 0.112 | 0.530 | 0.358 |
| 11 | 2.813 | 20.73 | 22.22 | 0.063 | 0.484 | 0.452 |
| 12 | 3.542 | 18.27 | 15.00 | 0.098 | 0.526 | 0.376 |
| 13 | 3.147 | 18.09 | 19.42 | 0.080 | 0.476 | 0.445 |
| 14 | 3.550 | 18.65 | 15.23 | 0.097 | 0.528 | 0.376 |
| 15 | 2.668 | 18.60 | 19.70 | 0.067 | 0.485 | 0.448 |
| 16 | 3.360 | 19.38 | 15.78 | 0.089 | 0.533 | 0.378 |
| 17 | 3.148 | 18.31 | 19.35 | 0.079 | 0.479 | 0.441 |
| 18 | 4.194 | 18.35 | 12.98 | 0.120 | 0.545 | 0.336 |
| 19 | 3.124 | 18.00 | 19.24 | 0.079 | 0.477 | 0.444 |
| 20 | 3.730 | 19.52 | 15.90 | 0.097 | 0.528 | 0.375 |

Example 14

The materials of experiments 1–20 were subject to $^{29}Si$ MAS NMR to determine the relative amounts of silicon in the five different environments, i.e., Si(4Si), Si(3Si), Si(2Si), Si(1Si), Si(0Si). The $^{29}Si$ Magic-angle spinning (MAS) nuclear magnetic resonance (NMR) spectra with proton decoupling were recorded on a Chemagnetics CMXII 500 spectrometer at 99.3 MHz using a 7.5 mm probe spinning at 6 kHz. Typical run conditions were: 800 to 10000 acquisitions; 4 or 5 sec. pulse width; 60 to 120 sec. relaxation delay. Chemical shifts were measured relative to tetramethylsilane (TMS). The spectra were then deconvoluted into the five silicon environments. The molar fractions of each silicon environment are given in Table 7.

TABLE 7

| Example | 4 Al, 0 Si | 3 Al, 1 Si | 2 Al, 2 Si | 1 Al, 3 Si | 0 Al, 4 Si |
|---|---|---|---|---|---|
| 1 | 54 | 21 | 13 | 9 | 4 |
| 2 | | | | | |
| 3 | | | | | |
| 4 | | | | | |
| 5 | 49 | 19 | 16 | 11 | 5 |
| 6 | 33 | 22 | 22 | 13 | 10 |
| 7 | | | | | |
| 8 | 36 | 17 | 7 | 17 | 23 |
| 9 | 24 | 31 | 18 | 18 | 9 |
| 10 | 24 | 44 | 15 | 14 | 3 |
| 11 | | | | | |
| 12 | | | | | |
| 13 | 32 | 32 | 22 | 5 | 9 |
| 14 | 41 | 31 | 6 | 12 | 10 |
| 15 | | | | | |
| 16 | | | | | |
| 17 | 35 | 15 | 10 | 18 | 22 |
| 18 | | | | | |
| 19 | | | | | |
| 20 | | | | | |

II. Discussion

A. Crystallite Size and Shape

It is well known that zeolite morphology has a major influence on the reactivities of zeolites. Such effects become more important with smaller pores and larger molecules. At very small crystal sizes, the exterior surface may play a major role in processes using such zeolites, especially the location of exterior pore openings with respect to the catalytically active sites.

Powder X-ray diffraction may be used for determining crystallite size (and often shape) of materials less than about 1000 Å by the relative broadening of peaks in the X-ray diffraction pattern. When the shape of the crystallites is anisotrophic (different dimensions in different directions), then the resulting powder diffraction pattern may have both broad and sharp peaks if one or two of the dimensions of the crystals are small enough to show peak broadening. Those reflections coming from Miller planes in the crystals corresponding to the short dimension will have broader peaks than those coming from Miller planes corresponding to the longer dimension will have sharper peaks.

SAPO-11 has an orthorhombic crystal structure, a structure which is frequently associated with spatial anisotropies. The dimensions of the unit cell are a =8.4 Å, =18.5 Å and c=13.5 Å, and the structure is such that the 10-ring channels run along the a dimension [100]. If the shape of the crystallites was platelet in shape such that the a dimension was significantly smaller than the b and c dimensions, one would expect the X-ray diffraction pattern to show the peaks corresponding to the (h00) reflections to be broader than those of the (0kl) reflections. This would result in those peaks corresponding to the (h00) reflections to have shorter peak height relative to the (0 kl) peaks, not due to a reduction on peak intensity, but to an increase in the peak width.

Figure 6:
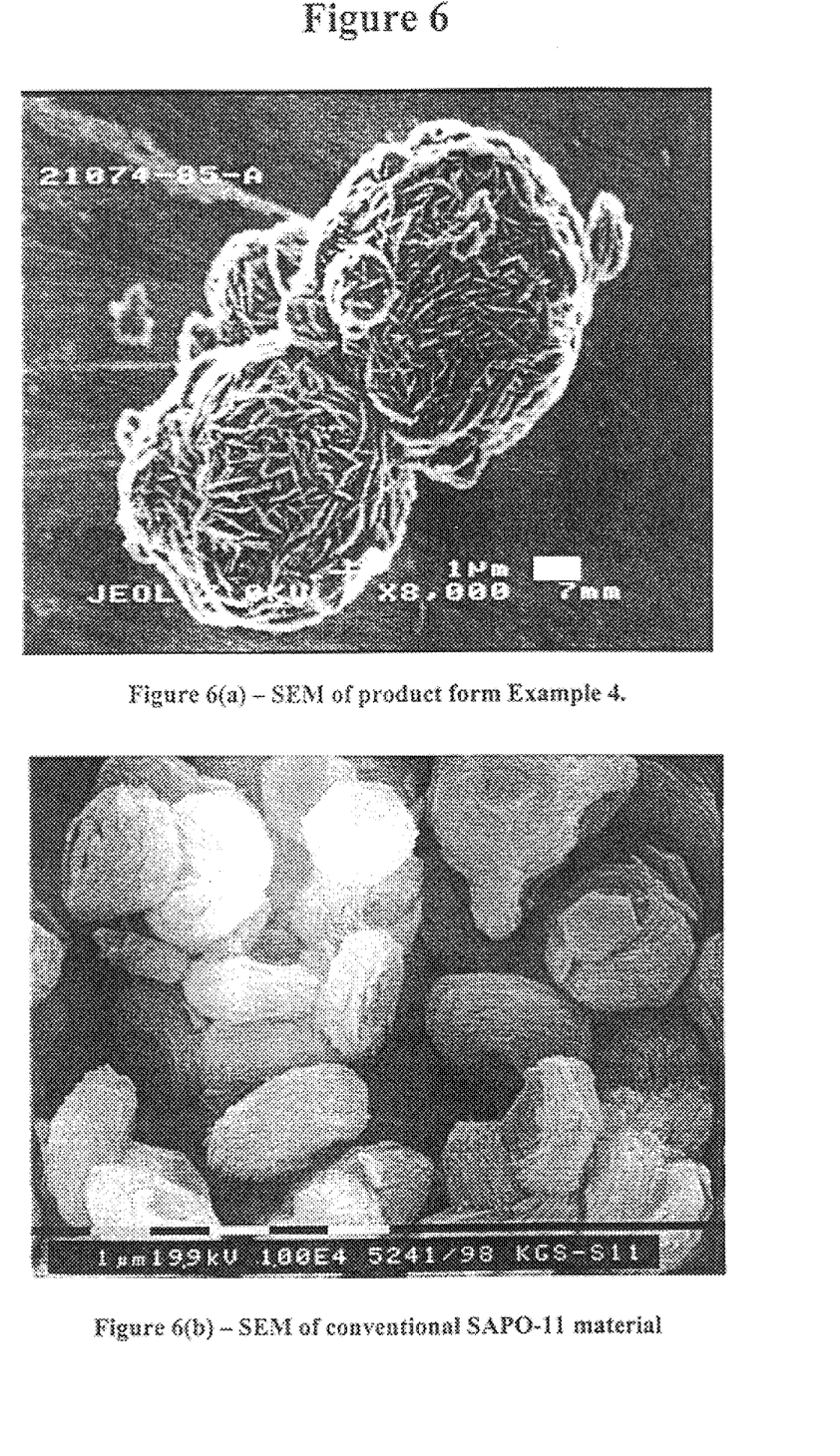
FIG. 6(a) shows scanning electron micrographs of an AEL-type SAPO prepared in accordance with the method of Example 4.
FIG. 6(b) shows an electron micrograph of conventionally-prepared SAPO-11.

While not wishing to be bound by any model or theory, it is believed that an increased catalytic activity for a molecular sieve catalyst would result when a large number of channel openings are available to allow for efficient transportation of the reacting species and products to and from the active sites inside of, or at the pore mouth of, the molecular sieve crystal. The preferred ECR-42 molecular sieve catalysts have this desirable spatial anisotropy (preferred orientation), as shown in the powder x-ray diffraction results in FIGS. 4 and 5. FIG. 6(*b*) reflections are clearly broader in width and shorter in height than surrounding (0kl) reflections as the reactants are changed from TEOS (Example 7) to TEOS and ethanol co-solvent (Example 6) to TEOS, surfactant, and ethanol co-solvent (Example 5). The SEM micrograph of FIG. 6(*a*) clearly shows the preferred thin platelets present in the product of Example 4. The platelets have a thickness less than 50 nm, well within the threshold for seeing X-ray diffraction peak broadening, and consistent with the diffraction patterns in FIGS. 4 and 5. FIG. 6(*b*) on the other hand, shows the undesirable thick platelet morphology that results in conventionally prepared SAPO-11.

B. Silicon Distribution by $^{29}$Si NMR

As discussed, while the preferred molecular sieve materials have an X-ray diffraction pattern with line positions corresponding to the AEL topology, they are physically and chemically distinct from known SAPO-11 materials because of differences in the local atomic arrangement of the component atoms. Conventional powder x-ray diffraction analysis not a sufficient analytical tool to determine the structural differences between SAPO-11 and the preferred ECR-42 molecular sieves partially because of x-ray line broadening, as discussed above. Consequently, in order to determine the above-noted structural differences, it is necessary to use an analytical tool which can discriminate between the atomic environment in the overall crystal structure such as $^{29}$Si MAS NMR, which is well known in the art. An example of how the number or Si nearest neighbors may be derived from NMR data is shown in FIG. 5 and Table 5.

Figure 3:
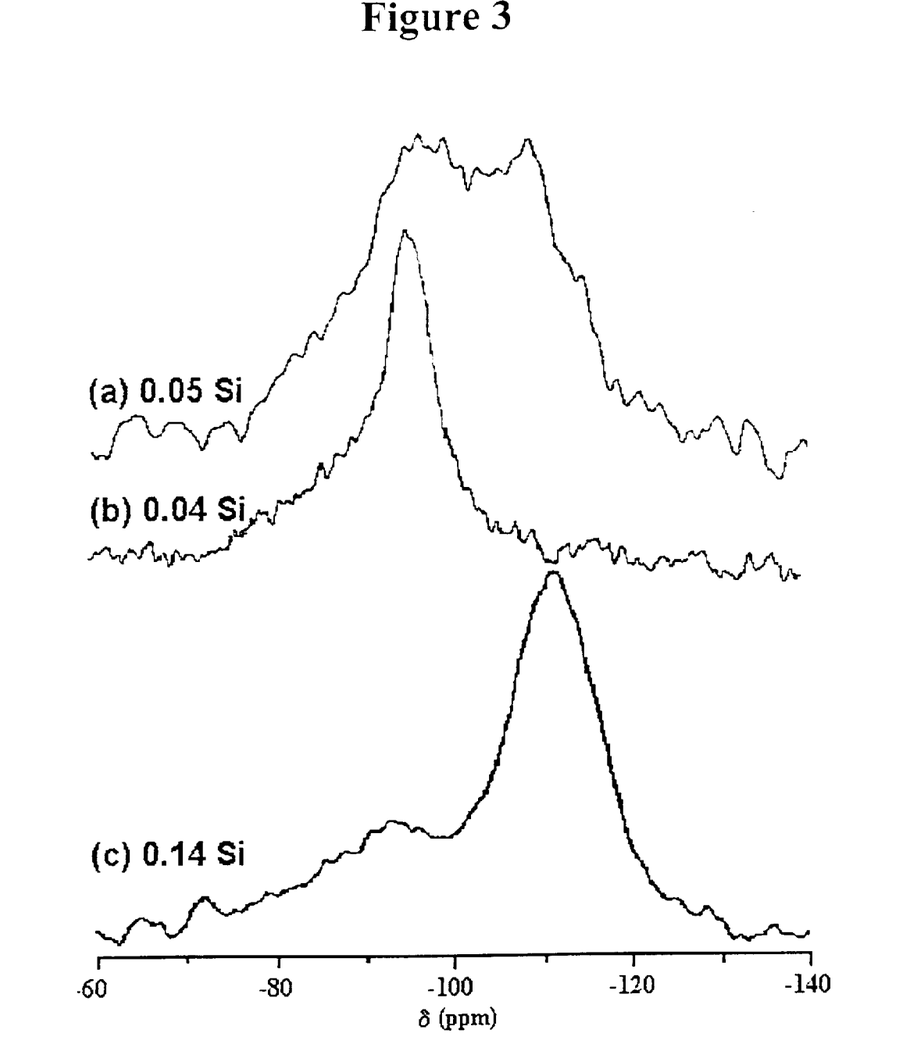

As discussed, it is believed that is the silicon distribution with the crystal is one important characteristic influencing catalytic activity in SAPO materials. Since silicon is responsible for the acidity in SAPO materials, it is desirable that silicon be well dispersed in the aluminophosphate framework for high catalytic activity. It is known that increasing silicon concentration in conventionally prepared SAPO-11 results in the formation of large silicon islands as shown in FIG. 3(*b*) (low Si concentration, some island formation) and FIG. 3(*c*) (high Si concentration, with extensive island formation). FIG. 3(*a*) shows that still lower Si concentration results in undesirable isolated silicon atoms. Although large silicon islands are undesirable because those silicon atoms at the interior of the islands are catalytically inactive, the small silicon-rich regions present in the preferred ECR-42 material are desirable because the strongest acid sites are believed to form at the borders of the Si-rich regions and the aluminophosphate domains. This is because those silicons at the borders have fewer aluminum atoms as nearest neighbors, which leads to decreasing acidity resulting from aluminum's lower electronegativity.

The distribution of silicon in SAPOs may be measured by $^{29}$Si NMR spectroscopy. For example, in SAPO-11, it is known that those silicon atoms having 4 aluminums and 0 silicons (4Al, 0Si) as nearest neighbors show as NMR resonance at –90 to –93 ppm chemical shift relative to tetramethylsiliane (TMS). Therefore, the molar percent of Si atoms with zero, one, two, three, and four Si atom nearest neighbors may be obtained, for example, by deconvoluting the integrated intensities from $^{29}$Si NMR measurements. The Si (4Al, 0Si) and the other silicon environments are illustrated schematically in FIG. 1 and listed in

TABLE 8

| Si Environment | 4Al, 0Si | 3Al, 1Si | 2Al, 2Si | 1Al, 3Si | 0Al, 4Si |
|---|---|---|---|---|---|
| Chemical shift ppm from TMS | –86 to –94 ppm | –95 to –99 ppm | –100 to –105 ppm | –106 to –108 ppm | –109 to –115 ppm |

Figure 7:
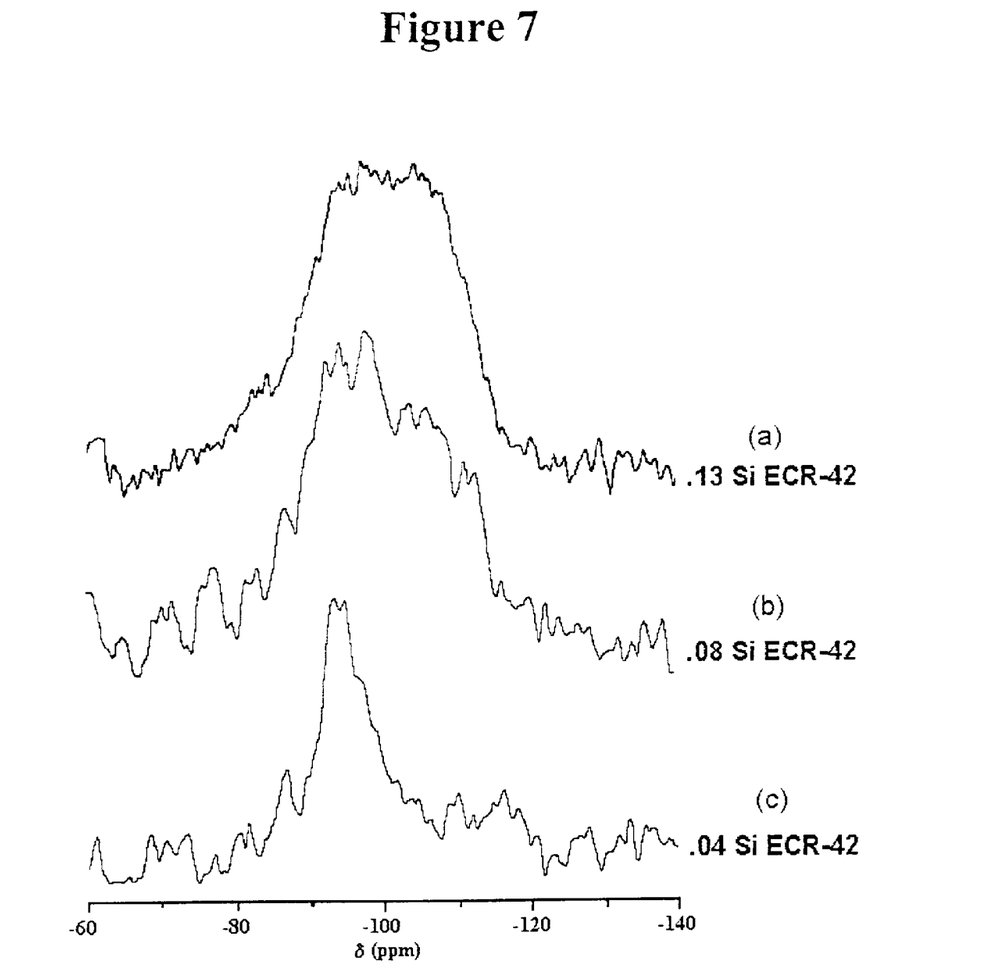
FIG. 7 shows the $^{29}$Si NMR spectra of ECR-42 having framework silicon in amounts ranging from about 5 molar % to about 13 molar %. Spectrum 7(a) shows ECR-42 with about 13 molar percent Si and having about 9% of the Si atoms located in silicon islands, representing a substantially reduced amount of framework Si in islands compared to conventional SAPO-11 of about the same Si content (FIG. 3(c). Spectrum 7(b) is of ECR-42 of example 6 containing about 7 molar % Si and having about 10% of the Si located in Si islands, and spectrum 7(c) shows a ECR-42 of example 1 containing about 4 molar % Si having about 4% of the Si located in Si islands.

It is clear from the above chart that for well dispersed silicon, a $^{29}$Si NMR spectra would have high intensity for the (4Al, 0Si) resonance at –86 to –94 ppm, while a poorly dispersed silicon would have high intensity at the (0 Al, 4Si) resonance at –109 to –115 ppm. Those silicons located at the border of the silicon atoms having the highest acid strength would show high relative intensity for the (3Al, 1Si), (2Al, 2Si), and (1Al, Si) resonances. FIG. 7 shows $^{29}$Si NMR spectra of the preferred ECR-42 molecular sieve with framework Si contents of 4, 8, and 13 molar %. The spectra show the excellent silicon dispersion in the preferred ECR-42 material. By way of comparison, FIG. 3 shows that Si islanding is avoided in conventional SAPO-11 at very low Si concentrations only. See FIG. 3(*a*). At Si content above 0.04 mole fraction, substantial Si islanding occurs. See FIG. 3(*b*) and (*c*). In particular, FIG. 7-B, shows that the preferred ECR-42 molecular sieve does not show undesirable Si island formation at higher Si concentrations than in the conventionally prepared sample of example 3(b).

Figure 2:
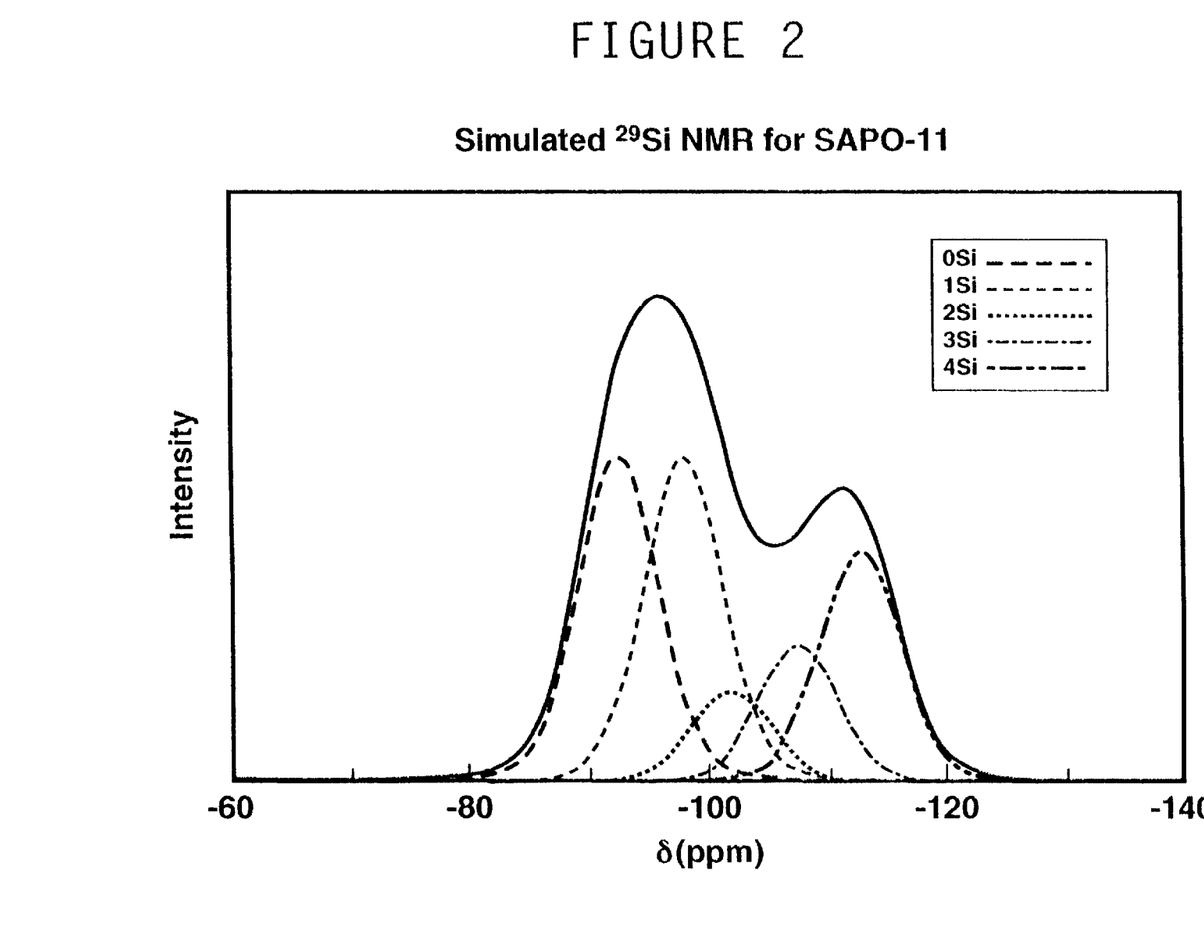
FIG. 2 shows a representative deconvolution of an $^{29}$Si NMR spectrum.

It should be noted that due to the characteristic of the experimental NMR spectra, the deconvolutions shown in FIG. 2 are not unique, but should be chosen with chemical sense. Therefore, the simulation results constitute an estimation of the different structural units contributing to the spectra, and may be used to illustrate Si atom coordination differences that are evident from the experimental data.

Moreover, the preferred molecular sieve, ECR-42, may contain Si concentrations as low as about 1 wt. %, and it is often difficult to obtain high quality NMR data from samples of such a low concentration over the whole range of chemical shifts. Consequently, some degree of uncertainty may be introduced into the deconvolutions required to determine the number of Si atoms with zero, one, two, three and four Si nearest neighbors. Nevertheless, the intensity of the −109 to −115 ppm region is sufficient in molecular sieve materials of even 1 wt. % to determine the approximate molar percent of Si framework atoms having four Si atom nearest neighbors, i.e., Si atoms located in Si islands.

What is claimed is:

1. A hydroprocessing method, comprising contacting a hydrocarbon with a catalytically effective amount of a SAPO catalyst under catalytic hydroprocessing conditions, the SAPO catalyst being a molecular sieve with a framework tetrahedra of silicon, aluminum, and phosphorus having a total silicon amount ranging from above about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the silicon present in the molecular sieve and the conventional SAPO-11 is distributed among silicon sites in the framework tetrahedra, each site having a first, a second, a third, and a fourth next nearest neighbor position, and each next nearest neighbor position being independently occupied by one atom selected from silicon, and aluminum, and (b) the molecular sieve has a substantially smaller number of silicon sites having silicon atoms among all four next nearest neighbor positions than the conventional SAPO-11 having the same silicon amount.

2. A hydroprocessing method comprising contacting hydrocarbon with a catalytically effective amount of a SAPO catalyst under catalytic hydroprocessing conditions, the SAPO catalyst being a molecular sieve framework tetrahedra of silicon, aluminum, and phosphorus, the composition having a total silicon amount ranging from about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL and being isostructural with conventional SAPO-11, wherein (a) the molecular sieve has a first number of Si atoms coordinated as Si(4Si), (b) the conventional SAPO-11 with the Si amount has a second number of Si atoms coordinated as Si(4Si), and (c) the first number of Si atoms is substantially less than the second number of Si atoms.

3. The method of claim 1 wherein the hydrocarbon is at least one of distillate, raffinate, synthetic hydrocarbon, deashphalted oil, and solvent dewaxed oil.

4. The method of claim 3 wherein the contacting occurs in the presence of hydrogen at a temperature of 250 ° C. to 430° C., a hydrogen pressure of 400 to 3000 psig, a liquid hourly space velocity of 0.1 to 30 v/v/h, and a hydrogen gas treat rate of 400 to 10,000 scf/b.

5. The method of claim 4 wherein the contacting occurs at a temperature of 280° C. to 400° C., a hydrogen pressure of 600 to 2500 psig, a liquid hourly space velocity of 0.3 to 7 v/v/h, and a hydrogen gas treat rate of 1000 to 5000 scfb.

6. The method of claim 5 wherein the catalyst is loaded with at least one metal chosen from Groups VIII, VIB and IB.

7. The method of claim 6 wherein the amount of metal ranges from 0.1 to 20 wt. % based on the weight of the catalyst.

8. The method of claim 7 wherein the hydroprocessing conditions are isodewaxing conditions.

9. The method of claim 2 wherein the hydrocarbon is at least one of distillate, raffinate, synthetic hydrocarbon, deashphalted oil, and solvent dewaxed oil.

10. The method of claim 9 wherein the contacting occurs in the presence of hydrogen at a temperature of 250 ° C. to 430° C., a hydrogen pressure of 400 to 3000 psig, a liquid hourly space velocity of 0.1 to 30 v/v/h, and a hydrogen gas treat rate of 400 to 10,000 scf/b.

11. The method of claim 10 wherein the contacting occurs at a temperature of 280° C. to 400° C., a hydrogen pressure of 600 to 2500 psig, a liquid hourly space velocity of 0.3 to 7 v/v/h, and a hydrogen gas treat rate of 1000 to 5000 scf/b.

12. The method of claim 11 wherein the catalyst is loaded with at least one metal chosen from Groups VIII, VIB and IB.

13. The method of claim 12 wherein the amount of metal ranges from 0.1 to 20 wt. % based on the weight of the catalyst.

14. The method of claim 13 wherein the hydroprocessing conditions are isodewaxing conditions.

15. A hydroprocessing method comprising contacting a hydrocarbon with a catalytically effective amount of a SAPO catalyst under catalytic hydroprocessing conditions, the SAPO catalyst being a molecular sieve framework tetrahedra of silicon, aluminum, and phosphorus, the composition having a total silicon amount ranging from about 4 molar percent to about 20 molar percent, a total aluminum amount ranging from about 40 molar percent to about 55 molar percent, and a total phosphorus amount ranging from about 30 molar percent to about 50 molar percent, the molar percents being based on the total amount of aluminum, phosphorus, and silicon present in the composition, and the molecular sieve having the topology AEL, wherein the number of Si atoms having no Si nearest neighbor ranges from about 0 mol. % to about 100 mol. %, the number of Si atoms having one Si nearest neighbor ranges from about 5 mol. % to about 25 mol. %, the number of Si atoms having two Si nearest neighbors ranges from about 0 mol. % to about 35 mol. %, the number of Si atoms having three Si nearest neighbors ranges from about 0 mol. % to about 25 mol. %, and the number of Si atoms having four Si nearest neighbors ranging from about 0 mol. % to about 50 mol. %, the mol. % being based on the total amount of silicon in the catalyst.

16. The method of claim 15 wherein the number of Si atoms having four Si nearest neighbors ranges from about 0 mol. % to about 25 mol. %.

17. The method of claim 16 wherein the number of Si atoms having four Si nearest neighbors ranges from about 0 mol. % to about 10 mol. %.

18. The method of claim 17 wherein the molecular sieve composition's Si content ranges from about 5 mol. % to about 15 mol. %.

19. The method of claim 18 wherein the molar % of framework silicon atoms having aluminum atom nearest neighbors is measured by $^{29}$Si MAS NMR.

20. The method of claim 19 wherein the contacting occurs in the presence of hydrogen at a temperature of 250° C. to 430° C., a hydrogen pressure of 400 to 3000 psig, a liquid hourly space velocity of 0.1 to 30 v/v/h, and a hydrogen gas treat rate of 400 to 10,000 scf/b.

21. The method of claim 20 wherein the contacting occurs at a temperature of 280° C. to 400° C., a hydrogen pressure of 600 to 2500 psig, a liquid hourly space velocity of 0.3 to 7 v/v/h, and a hydrogen gas treat rate of 1000 to 5000 scf/b.

22. The method of claim 21 wherein the catalyst is loaded with at least one metal chosen from Groups VIII, VIB and IB.

23. The method of claim 22 wherein the amount of metal ranges from 0.1 to 20 wt. % based on the weight of the catalyst.

24. The method of claim 23 wherein the hydroprocessing conditions are isodewaxing conditions.

25. The method of claim 24 including isomerizing 41 wt. % to 79 wt. % of the hydrocarbon with an isomerization selectivity at 50 wt. % hydrocarbon conversion ranging from 87 wt. % to 93 wt. %.

26. A hydroprocessing method comprising contacting a hydrocarbon with a catalytically effective amount of a SAPO catalyst under catalytic hydroprocessing conditions, the SAPO catalyst being formed by combining a phosphorus source, an aluminum source, a silicon source, a template, a water-soluble co-solvent, a surfactant, and water under gel formation conditions to provide a gel having the formula $$X_1 SURF : X_2 TEMP : Al_2O_3 : P_2O_5 : X_3 SiO_2 : X_4 H_2O : X_5 SOL,$$

wherein SURF is the surfactant, TEMP is the template, and SOL is the water-soluble co-solvent, and wherein $X_1$ ranges from about 0 to about 0.5, $X_2$ ranges from about 0.1 to about 4, $X_3$ ranges from about 0.01 to about 2, $X_4$ ranges from about 10 to about 100, and $X_5$ ranges from about 4 to about 20, and then heating the gel under molecular sieve crystallization conditions to form the catalyst.

27. The method of claim 26 wherein the silicon source material is at least one alkoxide of silicon.

28. The method of claim 27 wherein the aluminum source material is at least one of hydrated alumina, organo alumina, pseudo-boehmite, aluminum hydroxide, and colloidal alumina.

29. The method of claim 28 wherein the silicon source material is at least one of tetramethylorthosilicate, tetraethylorthosilicate, tetrapropylorthosilicate, and tetrabutylorthosilicate.

30. The method of claim 29 wherein the template is at least one of di-n-propylamine, diisopropylamine, and diethylamine.

31. The method of claim 30 wherein the template is di-n-propylamine.

32. The method of claim 31 wherein the co-solvent is at least one of acetone, 1,2-propanediol, 1,3-propanediol, methanol, ethanol, propanol, isopropanol, butanol, and ethylene glycol.

33. The method of claim 32 wherein the surfactant is one or more of hexadecylamine, tetradecylamine, dodecylamine, decylamine, or octylamine, dimethylhexadecylammine or dimethyloctylamine, and trimethylhexadecylammonium chloride.

34. The method of claim 33 wherein the phosphorus source material is one or more of $H_3PO_4$, and ammonium phosphate.

35. The method of claim 34 wherein the molecular sieve synthesis conditions include heating the gel in an autoclave for a time sufficient to crystallize the gel at a temperature ranging from about 100° C. to about 250° C.

36. The method of claim 35 wherein the gel is heated in a microwave autoclave.

37. The method of claim 36 further comprising calcining the catalyst.

38. The method of claim 37 wherein the catalyst is in the form of platelets having a first thickness in the (h00) direction and a second thickness in the (0kl) direction, the second thickness being greater than the first thickness, and the first thickness being less than 50 nm.

* * * * *